(12) United States Patent
El Tahry et al.

(10) Patent No.: US 6,830,020 B1
(45) Date of Patent: Dec. 14, 2004

(54) DIESEL ENGINE WITH INTAKE CAM PHASER FOR COMPRESSION RATIO CONTROL

(75) Inventors: Sherif Hussein El Tahry, Troy, MI (US); Roger B. Krieger, Birmingham, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/444,929

(22) Filed: May 23, 2003

(51) Int. Cl.$^7$ ................................................. F01L 1/34
(52) U.S. Cl. ............................... 123/90.15; 123/90.16; 123/90.17
(58) Field of Search .......................... 123/90.15, 90.16, 123/90.17, 90.18; 464/1, 2, 160

(56) References Cited

U.S. PATENT DOCUMENTS 4,474,008 A * 10/1984 Sakurai et al. ............. 60/605.2
5,692,464 A * 12/1997 Kimura .................... 123/90.15
6,644,272 B2 * 11/2003 Furukawa et al. .......... 123/378
6,684,852 B2 * 2/2004 Wright et al. ............... 123/431

FOREIGN PATENT DOCUMENTS

JP       2002339768 A  * 11/2002   ........... F02D/13/02

* cited by examiner

*Primary Examiner*—Thomas Denion
*Assistant Examiner*—Ching Chang
(74) *Attorney, Agent, or Firm*—Kathryn A. Marra

(57) ABSTRACT

A cam phaser is mounted on the intake camshaft of a diesel engine and is operable to selectively retard timing of only the intake valves relative to the crankshaft. The purpose of retarding timing of the intake valves is to retard valve closing sufficiently to shorten the effective compression strokes of the pistons and thus reduce the effective compression ratio. This occurs when the intake valves remain open past piston bottom dead center for a desired period into the normal compression stroke phase of engine operation. This reduces compression pressures so that combustion temperatures are reduced and exhaust emissions, primarily NOx, may be thus limited under conditions of warmed-up engine operation.

5 Claims, 2 Drawing Sheets

DIESEL ENGINE WITH INTAKE CAM PHASER FOR COMPRESSION RATIO CONTROL

TECHNICAL FIELD

This invention relates to diesel engines and, more particularly, to control of cylinder compression ratio using an intake cam phaser.

BACKGROUND OF THE INVENTION

It is known in the art to provide means for varying the compression ratio of a diesel engine in order to provide a relatively high compression ratio for cold starting and warm-up, where compression ignition is more difficult, and to provide reduced compression ratios for operating in other modes, particularly at high loads and speeds, to reduce peak combustion pressures and temperatures. Recently the emphasis for such arrangements is primarily to minimize emissions of nitrogen oxides (NOx) by operating at lower compression ratios where this is possible. Many devices have been proposed for compression ratio variation, including variable valve timing mechanisms and engine components such as pistons and cylinder heads with movable combustion chamber walls. In general these devices are relatively complex and add significant cost to the manufacture of an engine.

In spark ignition engines, cam phasers are known as simple devices for varying cam timing and thus changing valve timing to the extent permitted by the camshaft layout. These devices normally provide for advancing or retarding the cam timing in order to obtain desirable combustion characteristics. It is believed that cam phasers have not been utilized on diesel engines because the piston to cylinder head clearance is so small that altering intake and exhaust valve timing may result in contact of the pistons with the valves. A simple and relatively low cost apparatus and method for controlling compression ratio in a diesel engine is desired.

SUMMARY OF THE INVENTION

The present invention provides a desired engine combination by the addition of a cam phaser capable of retarding the timing of only the intake valves of a diesel engine in order to reduce its compression ratio. A typical diesel engine has cylinders and pistons defining expansible combustion chambers into which air is admitted and compressed during compression strokes of the pistons. Compression increases the air temperature so that injected fuel is self-ignited and burns, creating power to drive a crankshaft. Intake and exhaust valves, actuated by separate crankshaft driven intake and exhaust camshafts, control timed admission of air to and discharge of exhaust products from the combustion chambers.

In accordance with the invention, a cam phaser is mounted on the intake camshaft and is operable to selectively retard timing of only the intake valves relative to the crankshaft. The purpose of retarding timing of the intake valves is to retard valve closing sufficiently to shorten the effective compression strokes of the pistons and thus reduce the effective compression ratio. This occurs when the intake valves remain open past piston bottom dead center for a desired period into the normal compression stroke phase of engine operation. This reduces compression pressures in the combustion chambers so that combustion temperatures are reduced and exhaust emissions, primarily NOx, may be thus limited under conditions of warmed-up engine operation.

Additional reductions in combustion temperatures can be achieved, in conjunction with use of an intake cam phaser in turbocharged or supercharged diesel engines, by increasing the intake boost pressure to maintain constant trapped air mass in the cylinder, even when intake camshaft phase delay is utilized. This approach allows maintaining lower combustion temperatures, thus inhibiting NOx formation by preventing increases in fuel-air ratio as compression ratio is decreased.

These and other features and advantages of the invention will be more fully understood from the following description of certain specific embodiments of the invention taken together with the accompanying drawings.

DESCRIPTION OF THE PREFERRED EMBODIMENT

Figure 1:
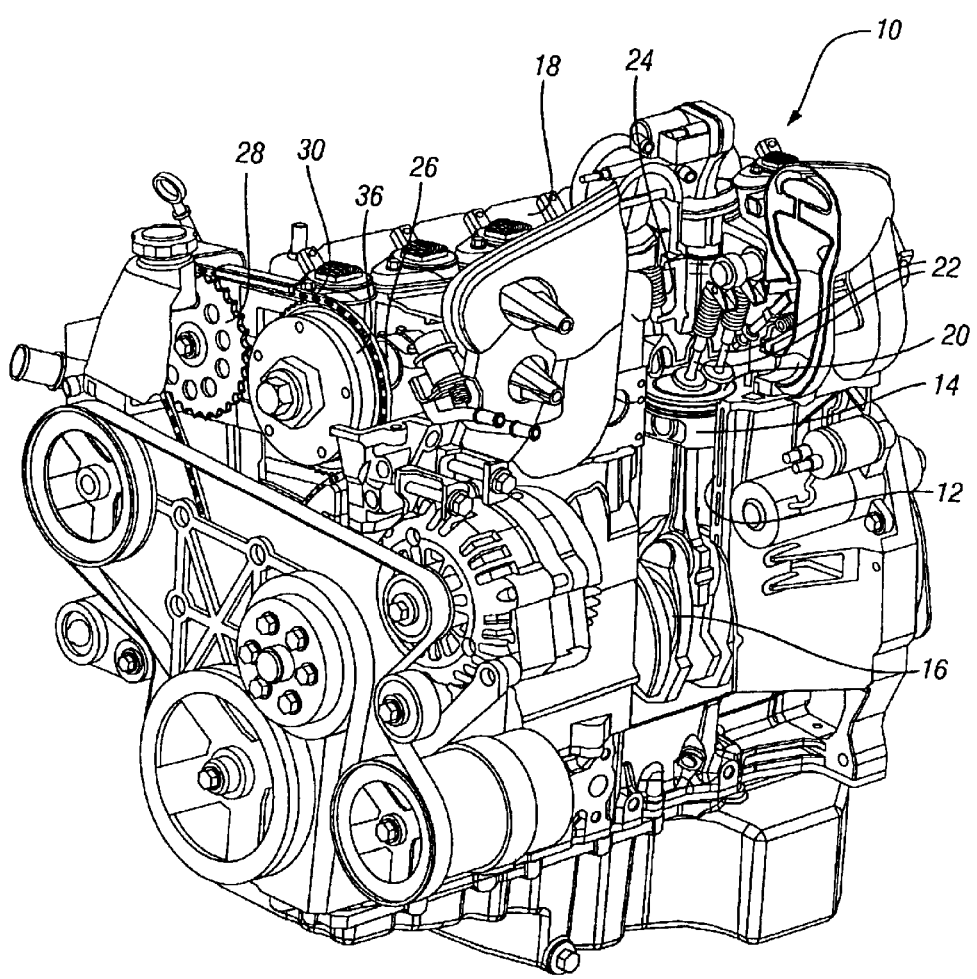
FIG. 1 is a pictorial view of a diesel engine having portions broken away to show the interior construction including application of a cam phaser on the intake camshaft.

Referring now to the drawings in detail, numeral 10 generally indicates a diesel engine having a variable compression ratio in accordance with the invention. Engine 10 conventionally includes a plurality of cylinders 12 having therein reciprocable pistons 14 connected with a crankshaft 16. The ends of the cylinder are closed by a cylinder head 18 so that the cylinders and pistons define expansible combustion chambers 20.

The cylinder head is provided with intake valves 22 which control the timing of intake air into the cylinders during intake strokes of the pistons. Exhaust valves 24 in the cylinder head control timing of the discharge of exhaust products from the combustion chambers during exhaust strokes of the pistons. In the engine shown there are two intake valves and two exhaust valves for each cylinder, however, any suitable number of valves provided for operation of the engine may be utilized in accordance with the invention.

The intake and the exhaust valves are actuated by separate intake and exhaust camshafts 26, 28. The intake and exhaust camshafts exclusively operate their respective intake and exhaust valves, however, both are driven by the crankshaft 16 through a timing chain 30.

Figure 2:
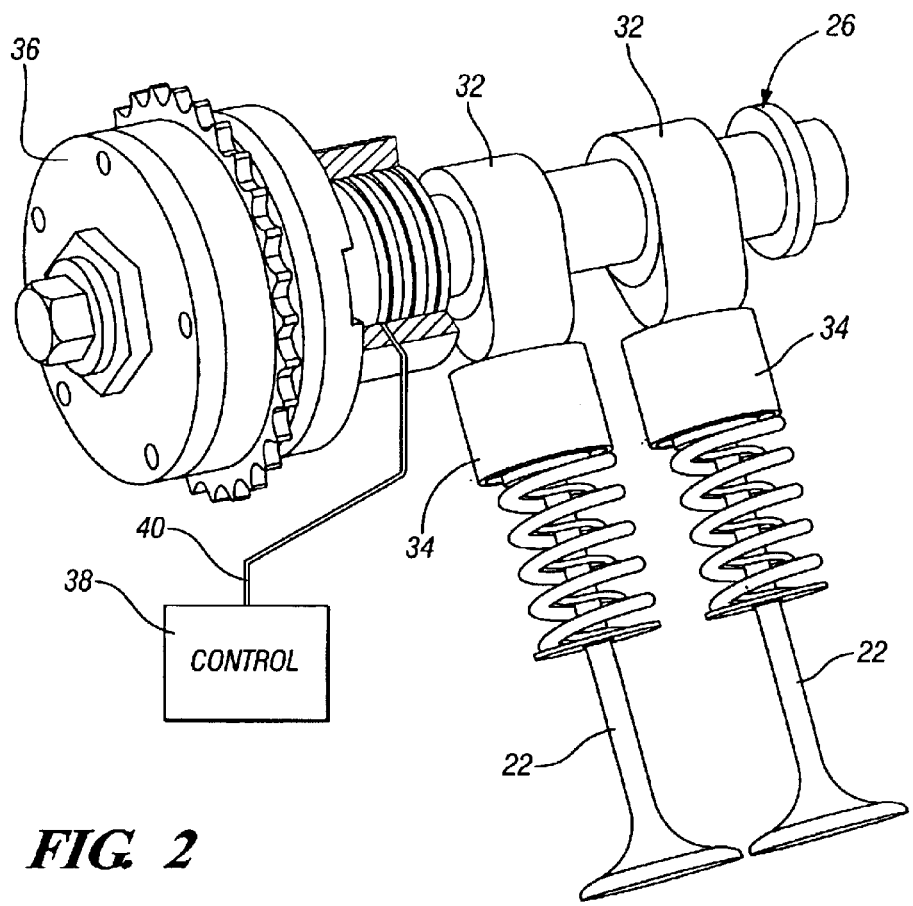
FIG. 2 is an enlarged pictorial view illustrating a portion of the intake camshaft together with the intake valves and cam phaser.

Referring to FIG. 2, there is shown an enlarged view of a portion of the intake camshaft 26 including cams 32 which engage hydraulic valve lifters 34 to actuate the intake valves 22. A cam phaser 36 is mounted on an outer end of the intake camshaft 26 and is connected with a control 38. Through internal passages 40, indicated schematically, the control 38 provides pressurized oil to the cam phaser as needed to alter timing of the intake valves by retarding or advancing their angular position relative to the phase angle of the camshaft.

Figure 3:
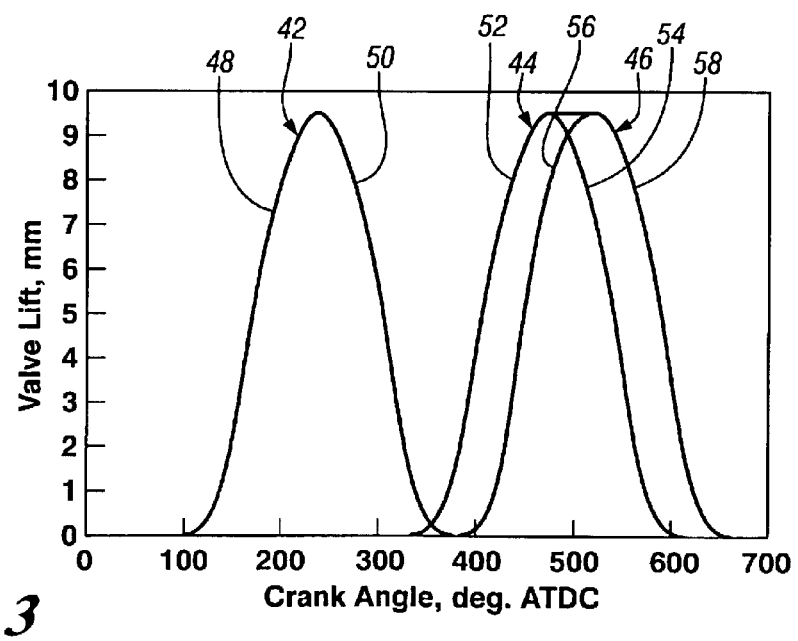
FIG. 3 is a valve lift diagram showing the variation in intake cam timing by the cam phaser.

Referring now to FIG. 3 of the drawings, there is illustrated a valve timing diagram. The lift motions of the valves are illustrated by an exhaust curve 42 and by a pair of intake curves 44, 46. As illustrated, exhaust valve opening begins at about 100 degrees after top dead center (ATDC) and rises on lift curve 48 to a peak at about 230 degrees ATDC.

Thereafter, exhaust valve closing proceeds down closing curve 50 to complete closing at about 370 degrees ATDC.

The nominal intake curve 44 begins intake valve opening at about 330 degrees ATDC and proceeds along lift curve 52 to a peak at about 460 degrees ATDC. Thereafter, the nominal intake curve proceeds down closing curve 54 to valve closing at slightly after 600 degrees ATDC. Operation with this nominal valve timing provides a relatively high compression ratio in the engine which may approximate 15/1 to 20/1 depending on the design of the particular engine.

In operation, the nominal mode of operation is utilized for cold engine starting and warm-up. This is necessary because the intake air charge must be compressed to a gas temperature high enough to provide reliable and consistent compression ignition of fuel injected into the combustion chambers near their piston top dead center positions. After the engine is warmed up and the cylinder and piston walls are heated, reduction of the compression ratio to a lower range, such as 12/1 to 15/1 depending on the engine configuration, can be utilized to provide effective compression ignition to operate with reduced combustion temperatures in order to control or limit NOx emissions.

Such reduction of combustion temperatures and emissions is obtained by reducing the engine compression ratio by the method of actuating the cam phaser 36 to retard the intake valve timing, as shown by the intake curve 46. With this cam timing, intake valve lift starts slightly before 400 degrees ATDC, about 50 degrees after closing of the exhaust valve. Valve lift proceeds along a lift curve 56 to a peak lift at about 550 degrees ATDC and then along a closing curve 58 to intake valve closing at about 650 degrees ATDC.

With this retarded timing, the intake valve closing is delayed until about 70 degrees before top dead center (TDC) of the respective pistons. Thus, the effective compression stroke is shortened by about 50 degrees from that of the nominal intake valve lift curve 44. The result is that the effective compression ratio of the engine is reduced.

While this will provide reduced combustion temperatures resulting in a reduction of NOx emissions, the effect is limited by fuel heating of the smaller gas charge. With a turbocharged or supercharged engine, the boost level may be increased to provide a trapped mass of the intake gas charge, including air and exhaust gases if needed, that is equivalent to the mass provided without the reduced compression ratio. Burning and expansion of the larger charge with the reduced compression ratio then results in a greater temperature reduction and a resulting greater reduction in NOx emissions.

When the engine is again operated at light loads or during starting and warm-up, the cam phaser is again returned to the initial nominal position and compression ratio is again increased so that dependable compression ignition of the intake air fuel charge is obtained.

In order to use a cam phaser in the manner outlined for reducing the effective compression ratio and resulting compression temperatures of a diesel engine, the engine intake and exhaust valves must be operated by separate camshafts so that only the intake valves are retarded. The variations in valve timing for which cam phasers are utilized in spark ignition engines are not generally usable in diesel engines because the exhaust valve timing cannot be retarded nor the intake valve timing be advanced without the pistons contacting the valves due to the low piston to head clearance. Thus, the application of cam phasers to a diesel engine is not known to have previously been considered practical.

However, the use in the present invention, where only retarding of the intake valves from their nominal timing is utilized, provides a simple and low cost method of controlling combustion temperatures and controlling NOx emissions in warmed-up operation of a diesel engine.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A diesel engine having cylinders and pistons defining expansible combustion chambers into which combustion supporting gas is compressed during compression strokes of the pistons for compression ignition and burning of injected fuel to drive a crankshaft, intake and exhaust valves actuated by crankshaft driven intake and exhaust camshafts for controlling the timed admission of air to and the discharge of exhaust from the combustion chambers, and the improvement comprising:

a cam phaser on only the intake camshaft and operable to selectively retard timing of only the intake valves relative to the crankshaft to retard intake valve closing sufficiently to shorten the effective compression stroke, thereby reducing the effective compression ratio and lowering combustion temperatures in the combustion chambers for controlling exhaust emissions under predetermined conditions of operations; and a control effective to vary intake valve timing from a nominal setting to a retarded closing timing of up to 70 degrees of crankshaft rotation.

2. A diesel engine as in claim 1 wherein the control is effective to maintain a nominal high compression ratio for cold engine starting and warm-up and to reduce the effective compression ratio for operation at warmed-up engine conditions to limit combustion temperatures during normal engine operation.

3. A diesel engine as in claim 2 wherein the control is responsive to combustion chamber temperatures.

4. A diesel engine as in claim 2 wherein the control is responsive to combustion chamber pressures.

5. A method of operating a supercharged diesel engine for controlling exhaust emissions during selected conditions of engine operation, the method including the steps of:

providing a cam phaser connected with an intake camshaft and operable to selectively retard intake cam timing for controlling timing of the intake valves;

operating the engine with a nominal cam timing for cold engine starting and warm-up;

actuating the cam phaser to retard intake cam timing under warmed-up engine conditions to provide preselected reduction of effective piston compression ratio of cylinder charge gases in order to lower NOx exhaust emissions; and boosting the pressure of the cylinder charge gases to provide a trapped charge mass equivalent to the charge mass without reduction of the compression ratio;

whereby NOx emissions are further reduced due to reduced combustion temperatures.

* * * * *